United States Patent [19]

Chambon

[11] 4,272,101
[45] Jun. 9, 1981

[54] SUSPENSION OF A GROUP OF VEHICLE WHEELS

[75] Inventor: Andre F. Chambon, Palaiseau, France

[73] Assignees: Societe Anonyme Automobiles Citroen; Automobiles Peugeot, both of France

[21] Appl. No.: 59,454

[22] Filed: Jul. 20, 1979

[30] Foreign Application Priority Data

Jul. 25, 1978 [FR] France ............................ 78 21974

[51] Int. Cl.³ .................................... B60G 11/38
[52] U.S. Cl. .................................... 280/692; 267/30
[58] Field of Search .......... 280/697, 71 S, 66 S, 280/720, 692, 694, 695, 697, 699, 700, 716, 719, 721; 267/25, 30, 57

[56] References Cited

U.S. PATENT DOCUMENTS

| | | | |
|---|---|---|---|
| 2,674,450 | 4/1954 | Frank | 267/4 |
| 2,890,895 | 6/1959 | Schilling | 280/692 |
| 3,021,153 | 2/1962 | Dickinson | 280/692 |
| 3,202,441 | 8/1965 | Tea | 280/695 |
| 3,278,196 | 10/1966 | Van Winsen | 280/665 |
| 3,701,542 | 10/1972 | Grosseau | 280/721 |

FOREIGN PATENT DOCUMENTS

| | | |
|---|---|---|
| 2116981 | 10/1972 | Fed. Rep. of Germany . |
| 774463 | 12/1934 | France . |
| 1395686 | 3/1965 | France . |
| 2366948 | 5/1978 | France . |
| 455908 | 10/1936 | United Kingdom ............ 280/695 |

Primary Examiner—Randolph A. Reese
Assistant Examiner—Norman L. Stack, Jr.
Attorney, Agent, or Firm—Poms, Smith, Lande & Rose

[57] ABSTRACT

The present invention relates to an improved suspension for a group of wheels of a vehicle comprising longitudinal torsion bars coupled to the wheels outside longitudinal rails and to an elastic stabilizer bar by means of a connecting piece. According to the invention, the bar extends in a part beyond the torsion bar, which part is capable of abutting on an elastic stop placed between it and a fixed part of the structure when the load of the vehicle exceeds a certain threshold. The invention is more particularly applicable to automobile construction.

4 Claims, 2 Drawing Figures

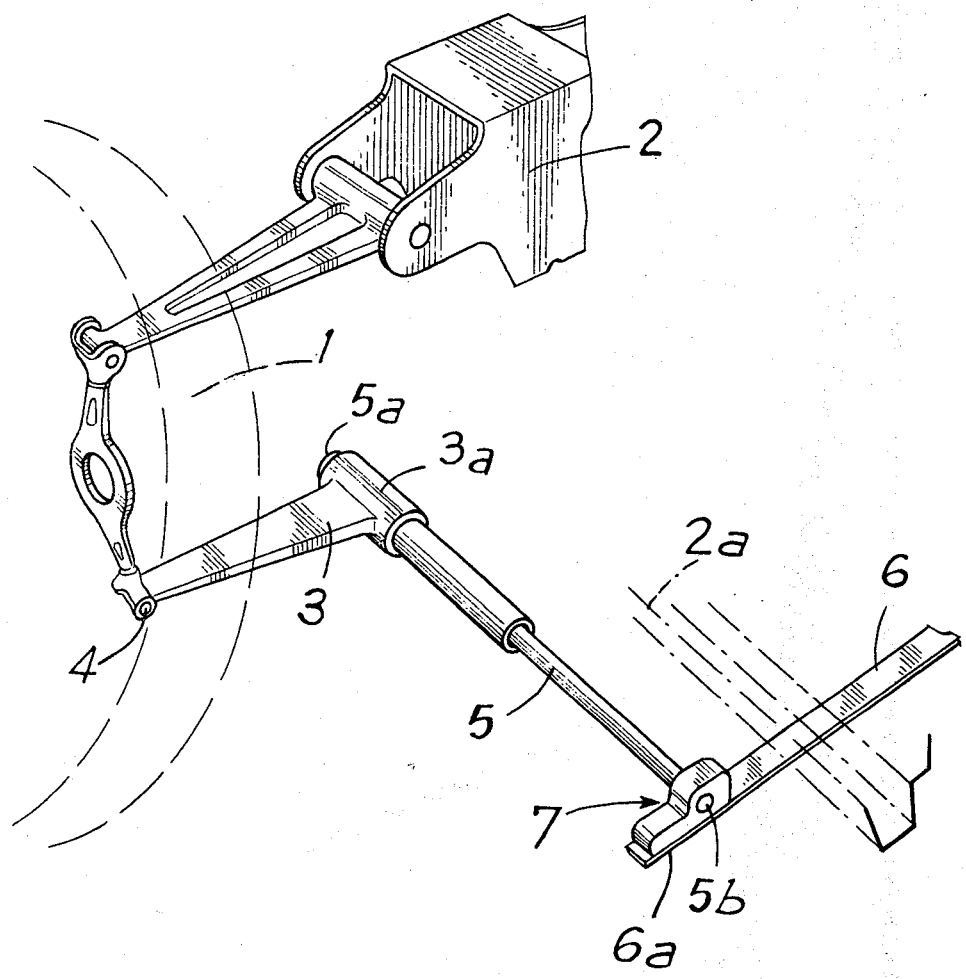

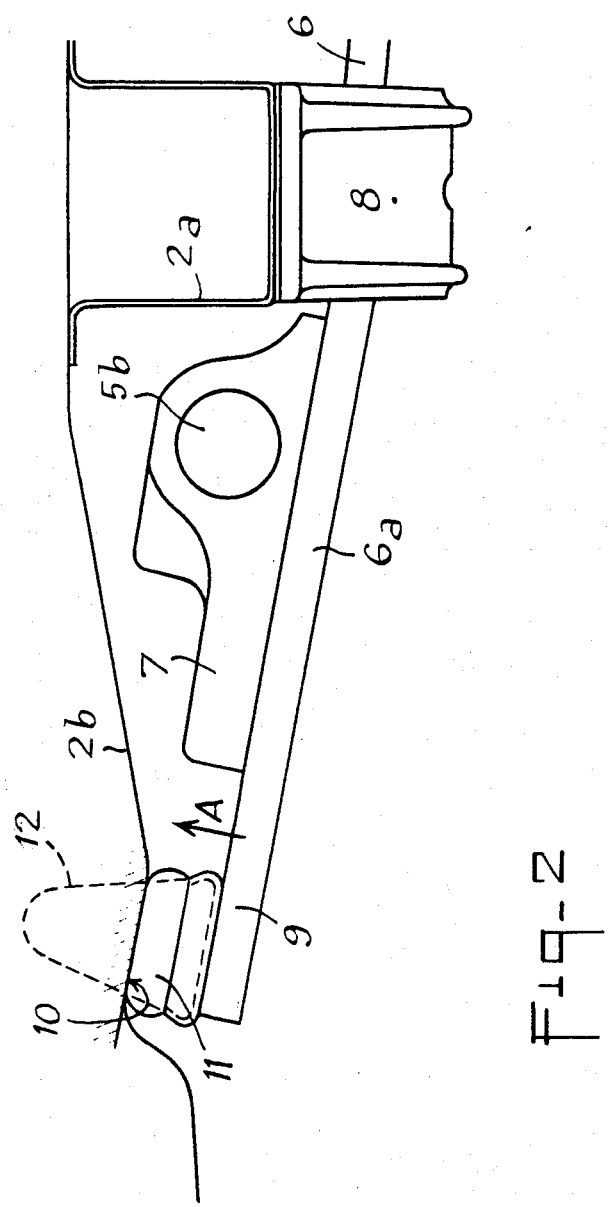

SUSPENSION OF A GROUP OF VEHICLE WHEELS

The present invention relates to an improvement in a suspension of a group of vehicle wheels.

It is known to make the suspension of a group of wheels of a vehicle (for example those of the front group) by means of longitudinal torsion bars, each of them being connected by one of its ends to the corresponding wheel, and by its other end to a common transverse elastic element called stabilizer.

In these known embodiments, certain are such that said torsion bars extend outside of longitudinal panels fast with the structure of the vehicle, for example the longitudinal rails, and substantially parallel thereto, the stabilizer extending transversely beyond these longitudinal rails to be coupled there to said torsion bars.

It is an object of the present invention to propose an improvement to this particular type of suspension allowing a modulation of the elastic characteristics of the stabilizer as a function of the load of the vehicle and therefore of the characteristics of the suspension whilst relieving said stabilizer of part of the forces which are applied thereto, leading to a lightened construction thereof.

To this end, the improvement forming the subject matter of the invention is relative to the suspension of a group of vehicle wheels comprising two wheels located respectively outside at least two longitudinal panels belonging to the structure of the vehicle, two suspension devices, each being constituted by at least one torsion bar substantialy parallel to the said panels connected at one of its ends to the correspondng wheel, and a transverse elastic member substantially perpendicular to said panels and anchored at the other end of each of the said torsion bars outside said panels.

According to one of the features of the invention, each end of said elastic member extends beyond its anchorage to the corresponding torsion bar with respect to said panel in an end part extending opposite an element fast with said structure whilst, between said element and said end part, there is disposed an elastically deformable stop tending to oppose their relative movement beyond a determined load threshold of the vehicle.

Said stop is either fast with said element and bears by simple contact on the elastic member, or fast with said elastic member and bears by simple contact on said element.

In a preferred embodiment, this stop is constituted by a cushion made of elastic material, of such dimensions that it acts only from the said determined load threshold.

The invention will be more readily understood on reading the following description with reference to the accompanying drawings, in which:

FIG. 1 diagrammatically shows a known suspension to which the invention relates.

FIG. 2 is a view in detail of the improvement according to the invention.

Referring now to the drawings, FIG. 1 shows the suspension, on the front left-hand wheel 1, of the structure 2 of the vehicle by means, in known manner, of a suspension arm 3 pivoted on the wheel at 4 and mounted to rotate on a longitudinal rail 2a belonging to the structure of the vehicle in a bearing (not shown) generally located in the vicinity of the end 3a of the arm 3.

A torsion bar 5, outside the longitudinal rail 2a, substantially parallel thereto, is fitted by one of its ends 5a in the arm 3 and is held in place in this arm by means of a locking device. The other end 5b of this bar is anchored to one of the ends 6a of a transverse elastic element 6 substantially perpendicular to said longitudinal rail, here in the form of a bar, having a function of stabilizer. The same arrangement must be imagined for the front right-hand wheel of the vehicle (not shown) the torsion bar relative to this wheel being anchored at the other end of the element 6.

The anchorage of each torsion bar on the bar 6 is here effected by means of an added part 7 fast with the bar 6. This anchorage is located outside the longitudinal rail 2a and consequently the bar 6 either passes through said longitudinal rail or passes thereunder through an elastic cushion fitted under the longitudinal rail.

FIG. 2 shows, in an end view, the longitudinal rail 2a belonging to the structure provided with a lower casing 8 which contains an elastic cushion through which the end 6a of the stabilizer bar 6 passes.

Contrary to what appears in FIG. 1, said end 6a extends beyond the part 7 in an end part 9 located opposite a rigid element 2b fast with the structure (for example a lower part of the body) comprising a surface 10 substantially parallel to the end part 9 of the bar. An elastically deformable stop 11 has been disposed between this surface and said end part, whose effect is to try to prevent the part 9 and surface 10 from approaching each other.

This stop will preferably be made of an elastic material of the elastomer type. In a first embodiment, this stop is fixed by any known means (adherence, fixation by means of a support . . . ) on the part 9 of the blade 6 and will bear by simple contact on the surface. In another embodiment, this stop will be fast with the element 2b for example by being glued to the bottom of a housing 12 shown in broken lines in the Figure and will bear by simple abutment on the part 9 of the bar 6.

When the load of the vehicle increases, the torsion bar 5 produces by its end 5a force in the piece 7 and the end 6a of the bar 6 which tends to displace the part 9 in the direction of the element 2b in the direction of arrow A. This displacement provokes the crushing of this stop between the elements 9 and 2b. As the stop is elastic, the reaction force which it exerts on the element 9, tending to oppose the above-mentioned approach will be greater as the crushing will be more pronounced. This results in the bar 6 being subjected to a supplementary force varying in the same direction as the load of the vehicle which has for its effect to oppose the deformations of the bar 6, the more energetically as the load is high. In other words, the rigidity of the bar 6 increases with the increase of the load.

Moreover, the force to which the part 9 of the bar is subjected opposes the increase of the deformation in flexion of this latter. It follows that this bar being less strained as far as the maximum deformations that it must undergo are concerned, may be lightened and reduced in dimensions.

Finally, the dimensions of the stop 11 may be provided to be such that its crushing is effective and produces a significant force only if the vehicle is subjected to a load greater than a given load (for example the weight of a person). Thus for example a stop may be provided which is slightly shorter than the distance separating the part 9 from surface 10, the vehicle being empty. Without departing from the scope of the invention, said stop, constantly in contact between the two elements 9 and 10, may also have a zone of considerable suppleness and little rigidity, which may be crushed without producing any significant force between these elements, the maximum value of this crushing corresponding to the said load threshold.

The invention finds interesting application in the field of automobile construction.

It is not limited to the description which has just been given but covers on the contrary all variants which might be made thereto without departing from its scope nor its spirit.

What is claimed is

1. An improvement in the suspension of a group of vehicle wheels comprising two wheels located respectively outside at least two longitudinal panels belonging to the structure of the vehicle, two suspension devices, each being constituted by at least one torsion bar substantially parallel to said panels connected at one of its ends to the corresponding wheel, and a transverse elastic member substantially perpendicular to said panels and anchored at the other end of each of the said torsion bars outside said panels, wherein each end of said elastic members extends beyond its anchorage to the corresponding torsion bar with respect to said panel in an end part extending opposite an element fast with said structure and there is disposed between said element and said end part an elastically deformable stop tending to restrain their relative approach beyond a determined load threshold of the vehicle.

2. Improvement as claimed in claim 1, wherein the step is carried by said end part of the elastic member and bears by simple contact on said element.

3. Improvements as claimed in claim 1, wherein said stop is fast with said element and bears by simple contact on said end part.

4. Improvement as claimed in any one of the preceding claims, wherein the stop is a cushion made of elastic material of such dimensions that it acts only from a determined load threshold mentioned above.

* * * * *